US006975699B2

United States Patent
Kresse

(10) Patent No.: US 6,975,699 B2
(45) Date of Patent: Dec. 13, 2005

(54) NON-INTRUSIVE X-RAY INSPECTION APPARATUS WITH STAIR-STEP CONFIGURATION OF X-RAY DETECTOR MODULES

(75) Inventor: David E. Kresse, Walnut Creek, CA (US)

(73) Assignee: InVision Technologies, Inc., Newark, CA (US)

( * ) Notice: Subject to any disclaimer, the term of this patent is extended or adjusted under 35 U.S.C. 154(b) by 225 days.

(21) Appl. No.: 10/369,712

(22) Filed: Feb. 19, 2003

(65) Prior Publication Data

US 2004/0161074 A1    Aug. 19, 2004

(51) Int. Cl.[7] ............................................. G01N 23/00
(52) U.S. Cl. ............................................. 378/19
(58) Field of Search ................................... 378/19

(56) References Cited

U.S. PATENT DOCUMENTS

| 5,757,878 | A | * | 5/1998 | Dobbs et al. ............... 378/19 |
| 5,818,897 | A |   | 10/1998 | Gordon et al. |
| 5,912,938 | A | * | 6/1999 | Dobbs et al. ............... 378/19 |
| 6,175,611 | B1 | * | 1/2001 | Melen et al. ............... 378/19 |
| 6,335,957 | B1 | * | 1/2002 | DiBianca ................... 378/19 |
| 2002/0097835 | A1 |   | 7/2002 | Fenkart et al. |

FOREIGN PATENT DOCUMENTS

WO      WO 95/08108      3/1995

* cited by examiner

*Primary Examiner*—Craig E. Church
(74) *Attorney, Agent, or Firm*—Blakely, Sokoloff, Taylor & Zafman; Stephen M. De Klerk

(57) ABSTRACT

In one embodiment, the invention provides a method for mounting a plurality of detector modules to a rotatable gantry structure for an x-ray detection machine. The method comprises mounting the plurality of detector modules end-to-end to define a stair-step configuration in an x-ray detection zone of the rotatable gantry structure.

16 Claims, 8 Drawing Sheets

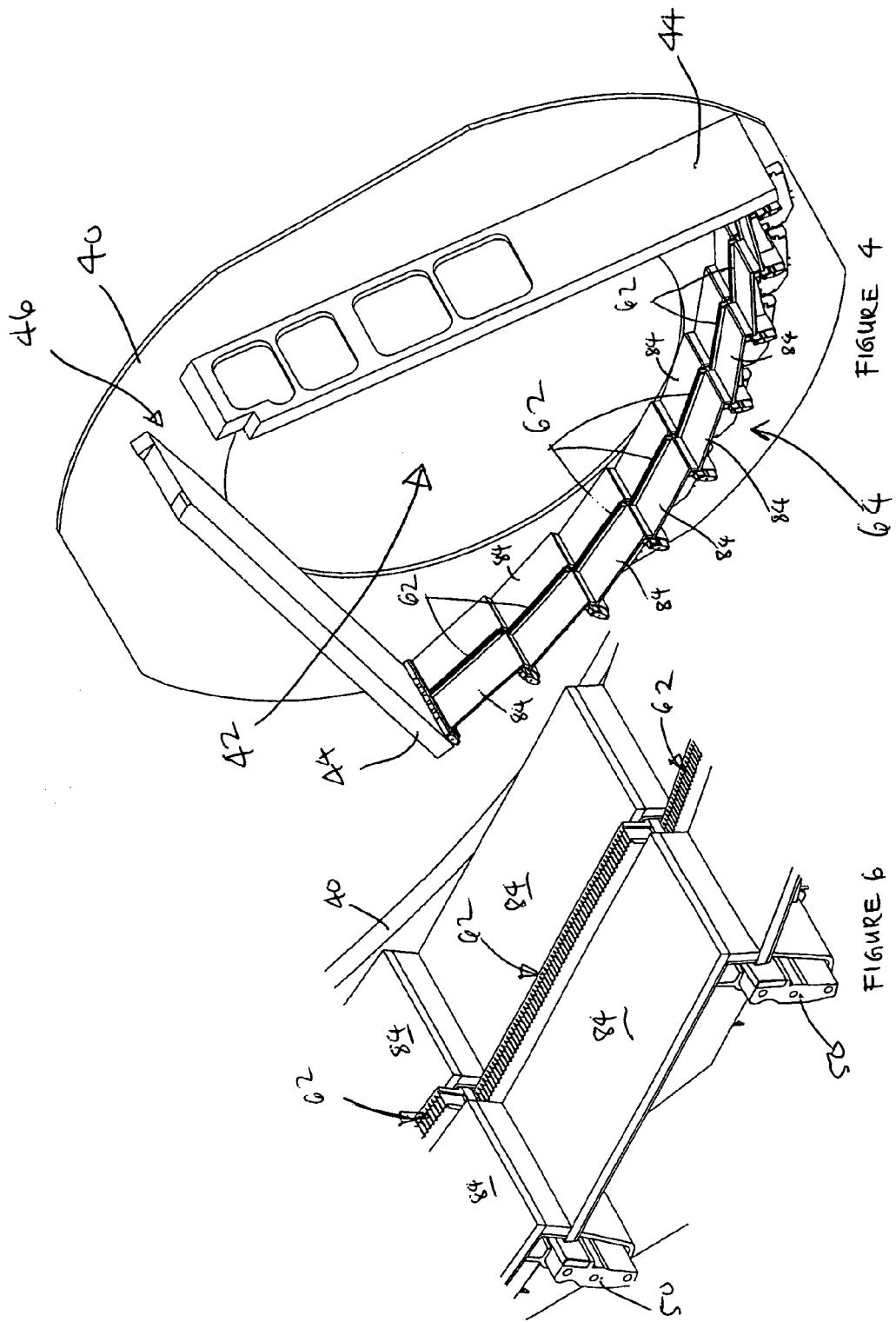

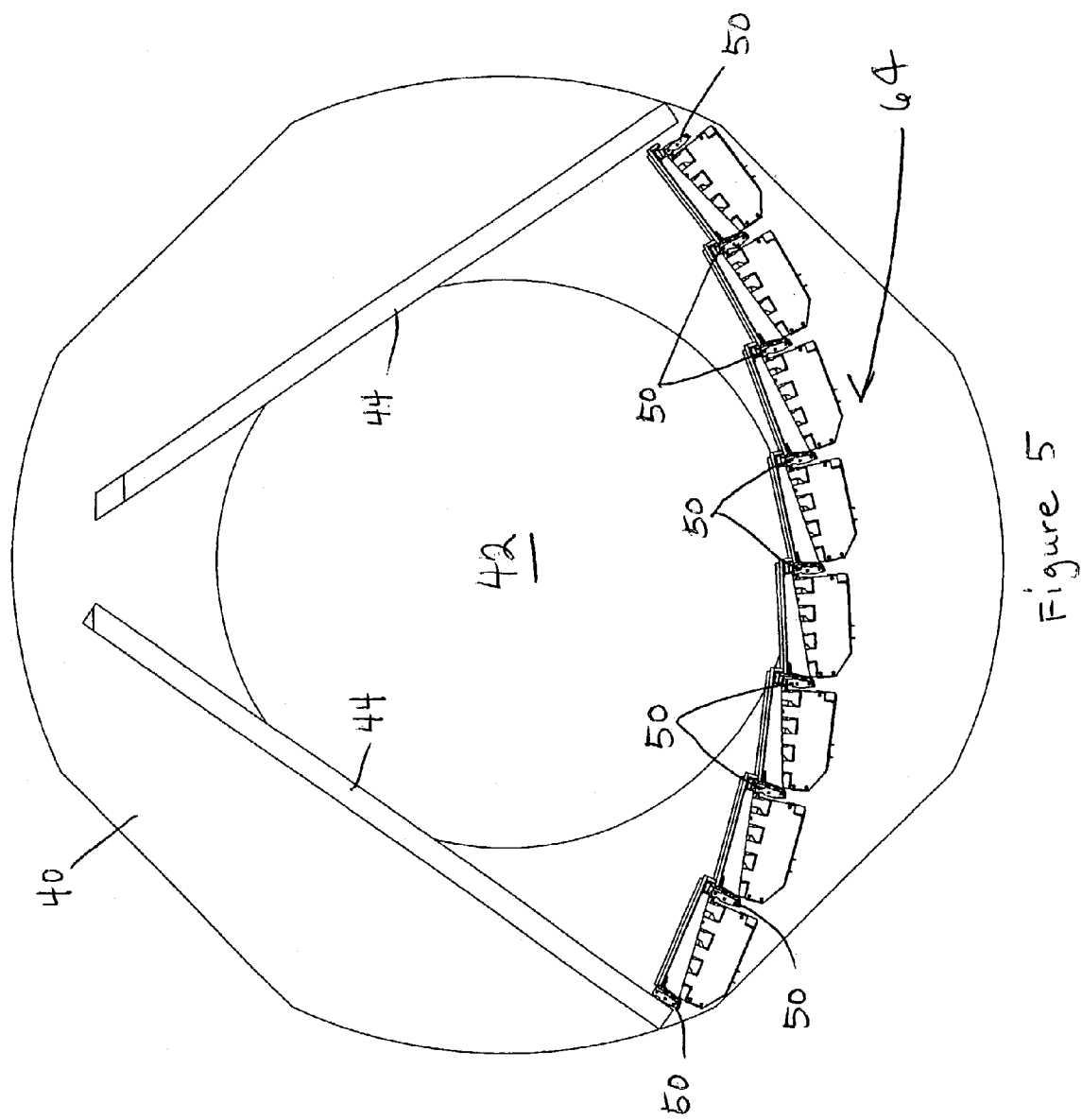

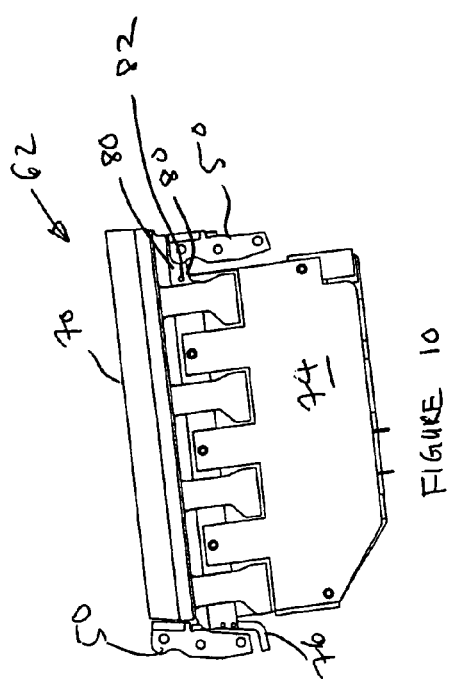
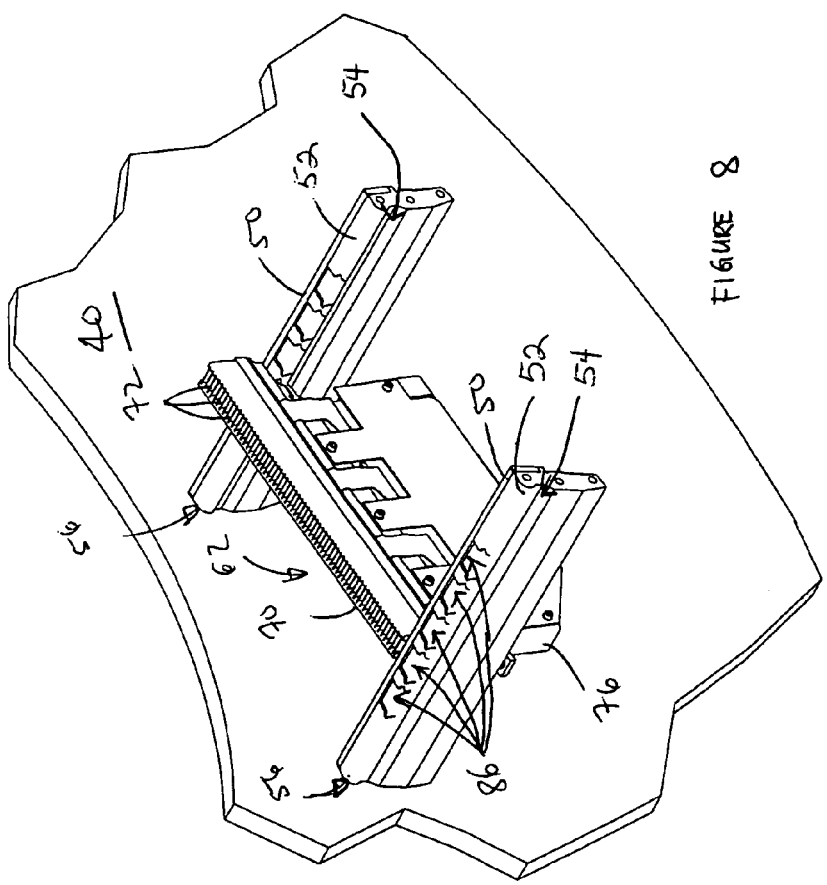

NON-INTRUSIVE X-RAY INSPECTION APPARATUS WITH STAIR-STEP CONFIGURATION OF X-RAY DETECTOR MODULES

STATEMENT REGARDING FEDERALLY SPONSORED RESEARCH OR DEVELOPMENT

Certain aspects of this invention were developed with support from the FAA (Federal Aviation Association). The U.S. Government may have rights in certain of these inventions.

FIELD OF THE INVENTION

This invention relates to an x-ray technique based non-intrusive inspection apparatus, particularly of the kind that may be used for non-instrusively inspecting closed containers before they are loaded into a baggage hold of an aircraft.

BACKGROUND

X-ray inspection apparatus used to inspect objects such as luggage at an airport comprise a gantry structure rotatably mounted around a tunnel through which the luggage to be inspected is conveyed. The gantry structure is designed to support an x-ray source at one end of the apparatus and a plurality of x-ray detectors mounted within an x-ray detection zone of the apparatus and located at an opposite end.

Each x-ray detector module includes a collimator piece to collimate the x-rays that emerge after passing through the luggage within the tunnel.

The x-ray detector modules are bolted to the gantry structure and have to be periodically removed for maintenance purposes. However, existing x-ray detector module designs include heavy lead shielding and therefore tend to be bulky and not conducive to easy removal. This problem is exacerbated by the fact that a service technician is required to unscrew multiple bolts in order to remove a single detector module.

SUMMARY OF THE INVENTION

According to one aspect of the invention, there is provided a method for mounting a plurality of detector modules to a rotatable gantry structure for an x-ray technique-based non-intrusive inspection apparatus, the method comprising mounting the plurality of detector modules end-to-end to define a stair-step configuration in an x-ray detection zone of the rotatable gantry structure.

According to another aspect of the invention, there is provided an x-ray detector module for an x-ray technique-based non-intrusive inspection apparatus, the module comprising a longitudinally extending collimator piece for collimating x-rays; and a housing within which is housed electronics to generate an electrical signal based on x-rays entering the collimator piece, wherein the housing depends from the collimator piece such that the housing is substantially in-line with the collimator piece when the collimator piece is viewed face-on.

According to yet another aspect of the invention, there is provided a gantry for an x-ray technique-based non-intrusive inspection apparatus, the gantry comprising a gantry structure defining an opening shaped and dimensioned to fit around an x-ray tunnel of the x-ray technique-based non-intrusive inspection apparatus, and an x-ray detection zone adjacent the opening wherein x-rays passed through the x-ray tunnel are detected; and a plurality of laterally spaced transversely extending mounting formations connected to the gantry structure in the x-ray detection zone.

According to another aspect of the invention, there is provided a gantry assembly for an x-ray technique-based non-intrusive inspection apparatus, the gantry assembly comprising a gantry structure defining an opening shaped and dimensioned to fit around an x-ray tunnel of the x-ray inspection machine, and an x-ray detection zone adjacent to the opening wherein x-rays passed through the x-ray tunnel are detected; a plurality of laterally spaced transversely extending cross-beams connected to the gantry structure within the x-ray detection zone; and at least one line of x-ray detector modules mounted end-to-end between adjacent cross-beams to define a stair-step configuration.

According to yet a further aspect of the invention, there is provided an x-ray technique-based non-intrusive inspection apparatus comprising an x-ray tunnel through which goods to be inspected pass in use; a gantry structure rotatably mounted around the x-ray tunnel; an x-ray source mounted at one end of the gantry structure; and at least one line of x-ray detected modules mounted end-to-end to the gantry structure to form a stair-step configuration in an x-ray detection zone of the gantry structure, which zone is located opposite the end with the x-ray source.

According to yet another aspect of the invention, there is provided an x-ray technique-based non-intrusive inspection apparatus comprising an x-ray tunnel; a conveyor system to convey goods to be inspected through the x-ray tunnel; a gantry structure rotatably mounted around the x-ray tunnel; an x-ray source mounted at one end of the gantry structure; and at least one line of x-ray detector modules mounted end-to-end to the gantry support structure to form a stair-step configuration in an x-ray detection zone at the gantry structure, which zone is located opposite the end with the x-ray source.

BRIEF DESCRIPTION OF THE DRAWINGS

The invention is further described by way of example with reference to the accompanying diagrammatic drawings wherein like reference numbers indicate like or similar components and wherein:

FIG. 4 is a perspective view of the gantry structure of FIG. 3, wherein one of the gantry plates has been removed;

FIG. 5 is a side-view of one of the gantry plates of the gantry structure shown in FIGS. 3 and 4, wherein a stair-step configuration forming part of the gantry structure may be seen;

FIG. 6 is a perspective view showing the components of the stair-step configuration in greater detail;

FIG. 8 shows a perspective view of an x-ray detector module mounted between two cross-beams, in accordance with one embodiment of the invention;

FIG. 10 is a side-view of an x-ray detector module in accordance with one embodiment of the invention.

DETAILED DESCRIPTION

Figure 1:
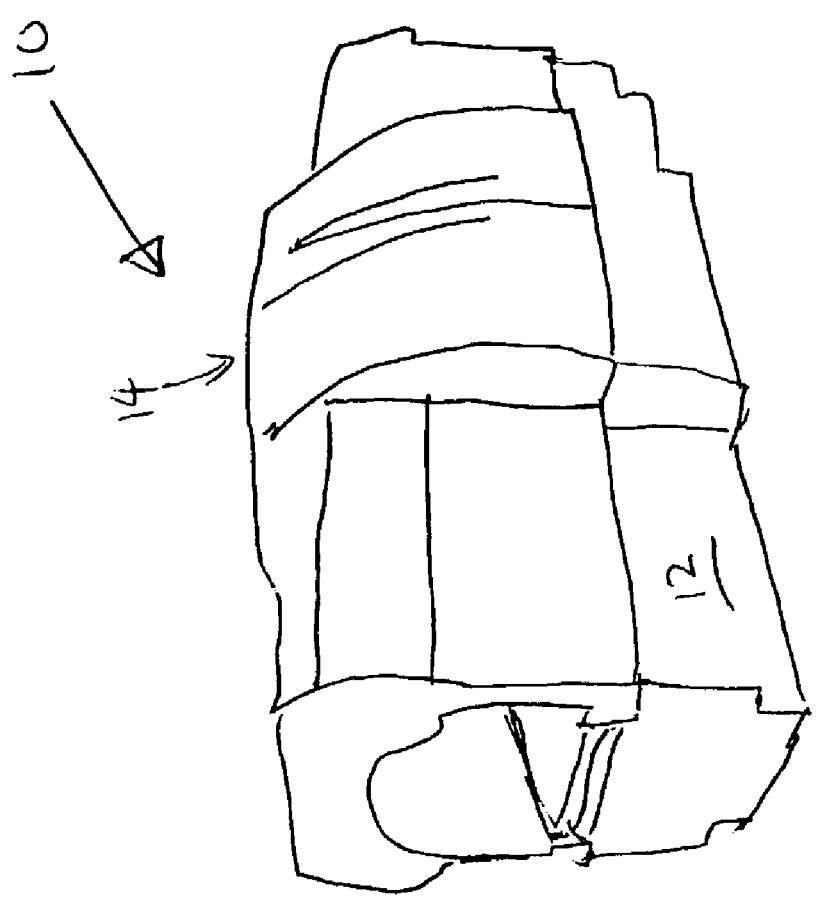
FIG. 1 is a perspective view of an x-ray technique-based non-intrusive inspection apparatus according to one embodiment of the invention.
Figure 2:
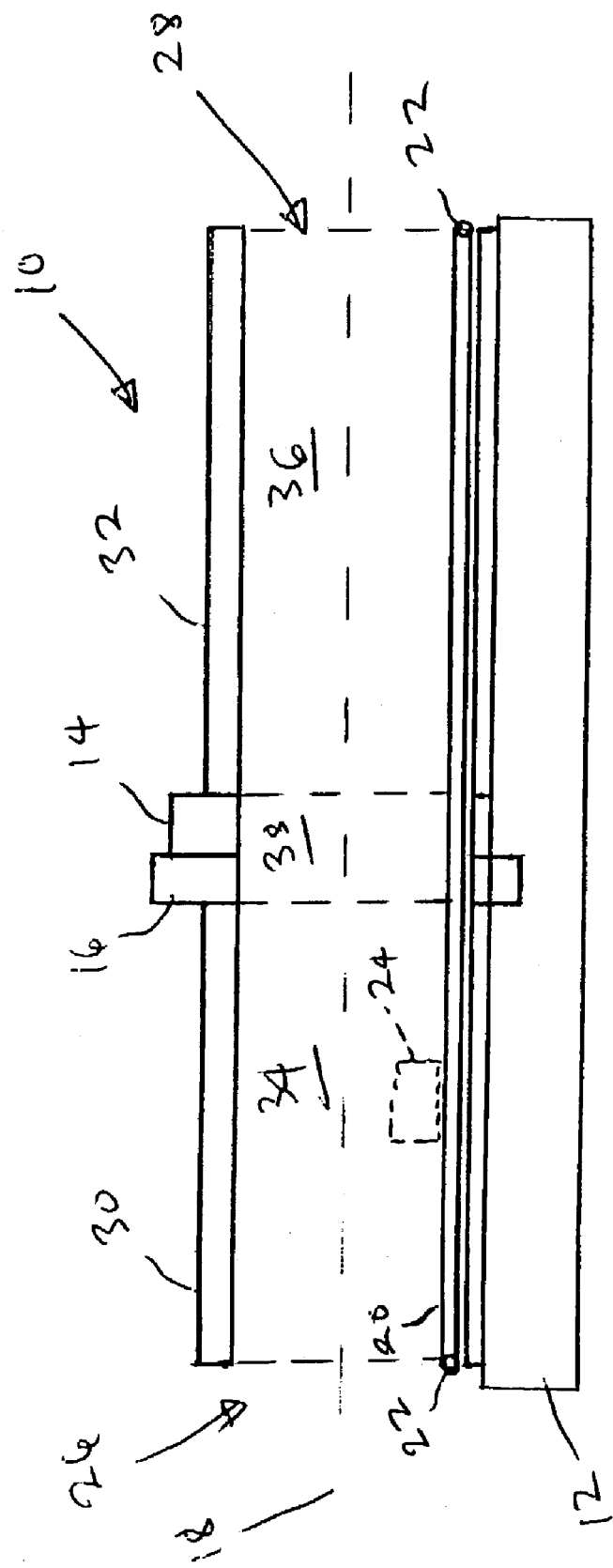
FIG. 2 is a cross-sectional side view representing some of the components of the inspection apparatus of FIG. 1.

FIG. 1 and FIG. 2 illustrate an x-ray technique-based non-intrusive inspection apparatus 10 in accordance with one embodiment of the invention.

The inspection apparatus 10 includes a support frame comprising an elongate base 12 and a vertical support in the form of an arch 14 mounted to the base 12 intermediate its ends. A gantry structure 16 is rotatably mounted to the arch 14 via a mounting arrangement (not shown), but will be understood by one skilled in the art to include components such as, a bearing assembly, mounting brackets, etc.

The gantry structure 16 rotates about a longitudinal axis 18 of the inspection apparatus 10 (see FIG. 2). The inspection apparatus 10 also includes a conveyor system comprising a conveyor belt 20 rotatably supported on conveyor rollers 22 which are mounted to the base 12 by mounting brackets (not shown). In use, the conveyor rollers 22 are driven by an electric motor (not shown) which in turn drives the conveyor belt 20 so that an article to be inspected, such as an item of luggage 24, may be conveyed by the conveyor belt 20 from one end 26 of the apparatus 10 to an opposite end 28 thereof.

Cover pieces 30 and 32 are mounted to the base 12 on either side of the arch 14 to define a fore loading tunnel section 34 and an aft off-loading tunnel section 36, respectively. The loading tunnel sections 34 and 36 are separated by an inspection tunnel section 38.

Figure 3:
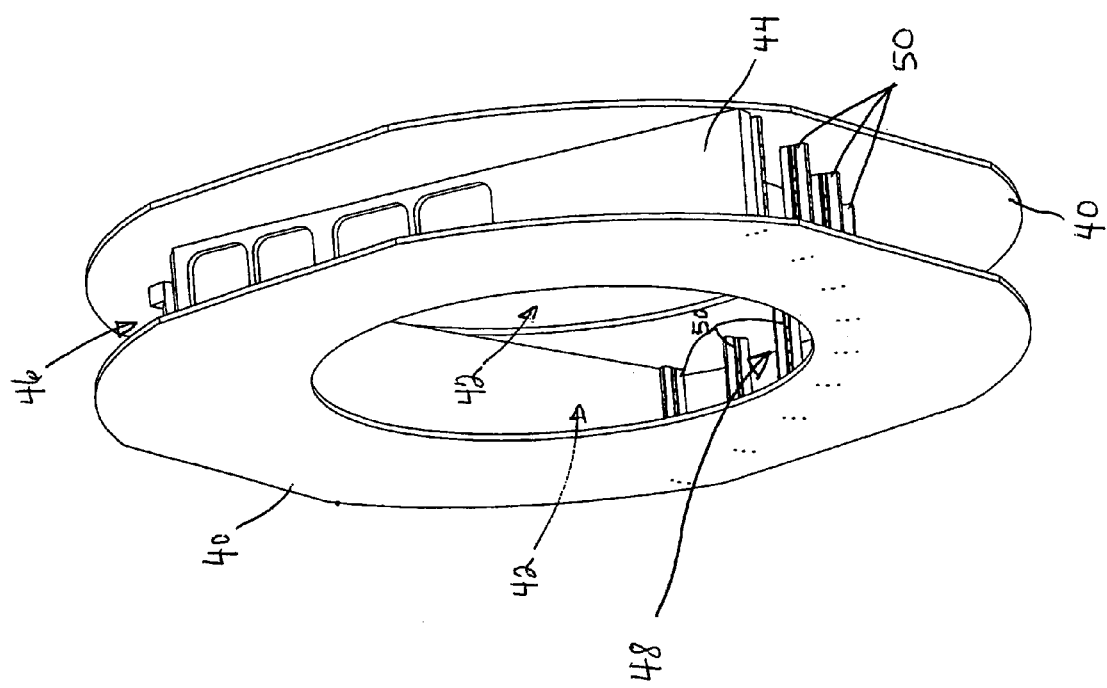
FIG. 3 is a perspective view representing some of the components of a gantry structure for the inspection apparatus of FIGS. 1 and 2.

FIG. 3 shows in perspective view of some of the components that make up the gantry structure 16 in accordance with one embodiment of the invention. Referring to FIG. 3, it will seen that the gantry structure 16 includes two gantry plates 40 each defining a central aperture 42. The gantry plates 40 are bolted to opposed ends of transverse support beams 44. The aperture 42 of each gantry plate 40 is shaped and dimensioned to fit around the inspection tunnel section 38. In use, an x-ray source (not shown) is mounted in a first zone 46 between the gantry plates 40 and serves as a source of x-rays which pass through an article to the inspected in the inspection tunnel section 38 and enter an x-ray inspection zone 48 between the gantry plates 40, where they are detected.

A plurality of laterally spaced transversely extending support members (mounting formations) in the form of cross-beams 50 are mounted between the gantry plates 40 in the x-ray detection zone 48. Part of the function of the cross-beams 50 is to provide stiffness to the gantry structure 16 in the x-ray detection zone 48. Another function of the cross-beams 50 is to provide support for x-ray detector modules 62 as will now be described.

Figure 7:
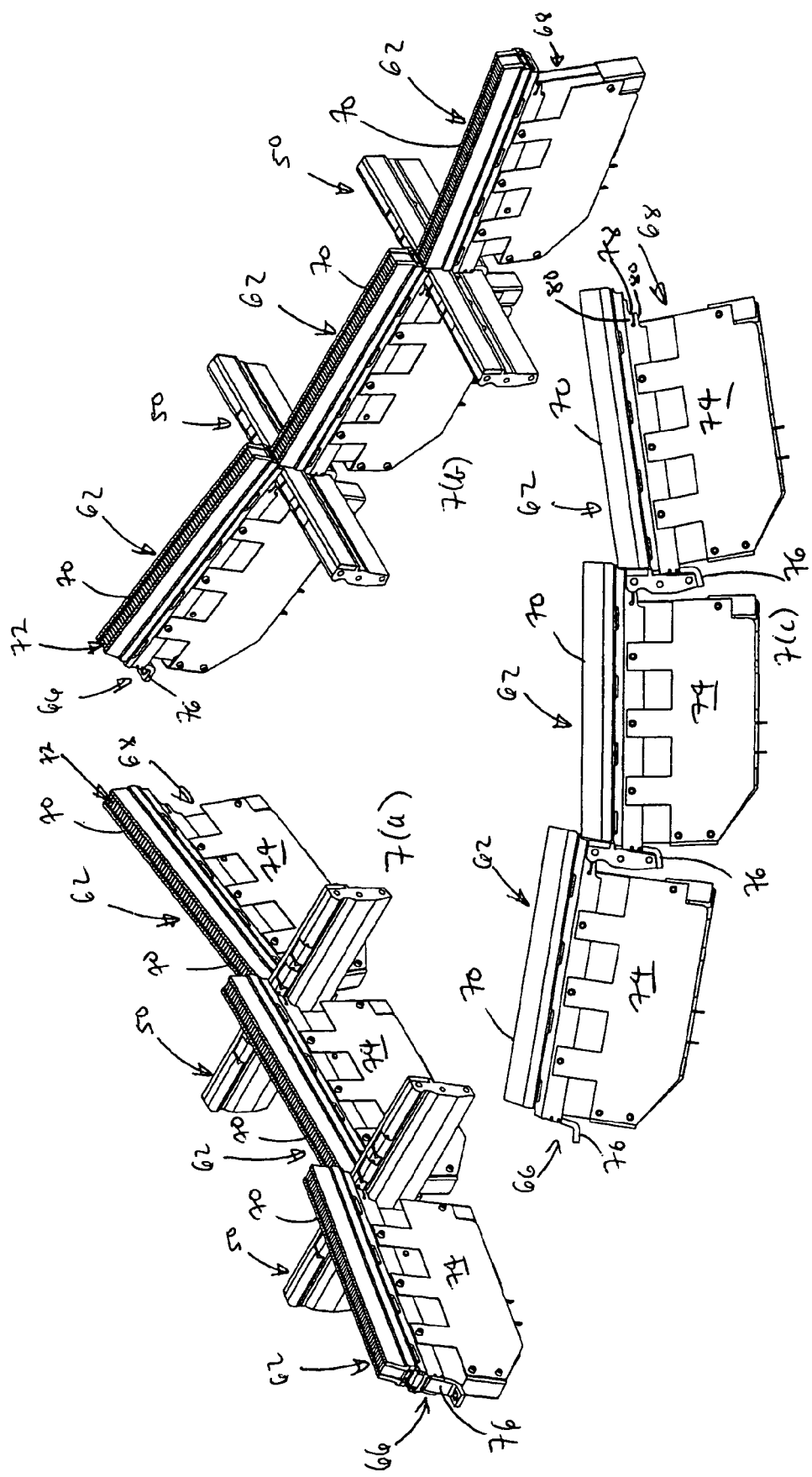
FIGS. 7(a) to 7(c) are perspective views of some of the components that make up the stair-step configuration.

As can be seen from FIGS. 4, 5, and 7 of the drawings, a plurality of x-ray detector modules 62 are mounted end-to-end within the x-ray detection zone 48 to define a stair-step configuration 64. Each x-ray detector module 62 has a first end 66 and second end 68 which is spaced from the first end 66 along a long axis of the x-ray detector module 62. A collimator piece 70 extends between the first end 66 and second end 68 and includes a plurality of collimator blades 72 which serve to collimate x-rays that emerge from the inspection tunnel section 38 after having passed through an article to be inspected. Each x-ray detector module 62 also includes a housing 74 which houses electronics (not shown) for generating an electrical signal based on the x-rays detected by a line of x-ray detectors (not shown) immediately below the collimator piece 70.

The housing 74 depends directly from the collimator piece 70 so that when the collimator piece 70 is viewed face-on, the housing 64 is substantially in-line with the collimator piece and is obscured by the collimator piece 70.

Each x-ray detector module 62 has a mounting bracket 76 fast with the first end 66. The end 68 of each x-ray detector module 62 has a mounting formation 78 which can best be described as a "quick release" type mounting formation which allows the end 68 of a detector module 62 to be secured to one of the transverse cross-beams 50 without the need for a screw type fastener. In order to achieve this "quick release" characteristic of being able to be secured without the use of a screw type fastener, the mounting formation 78 is bifurcated into prongs 80 which are separated by a transverse slot 82. The prongs 80 are shaped and dimensioned to mate with a cross-beam 50.

Figure 9:
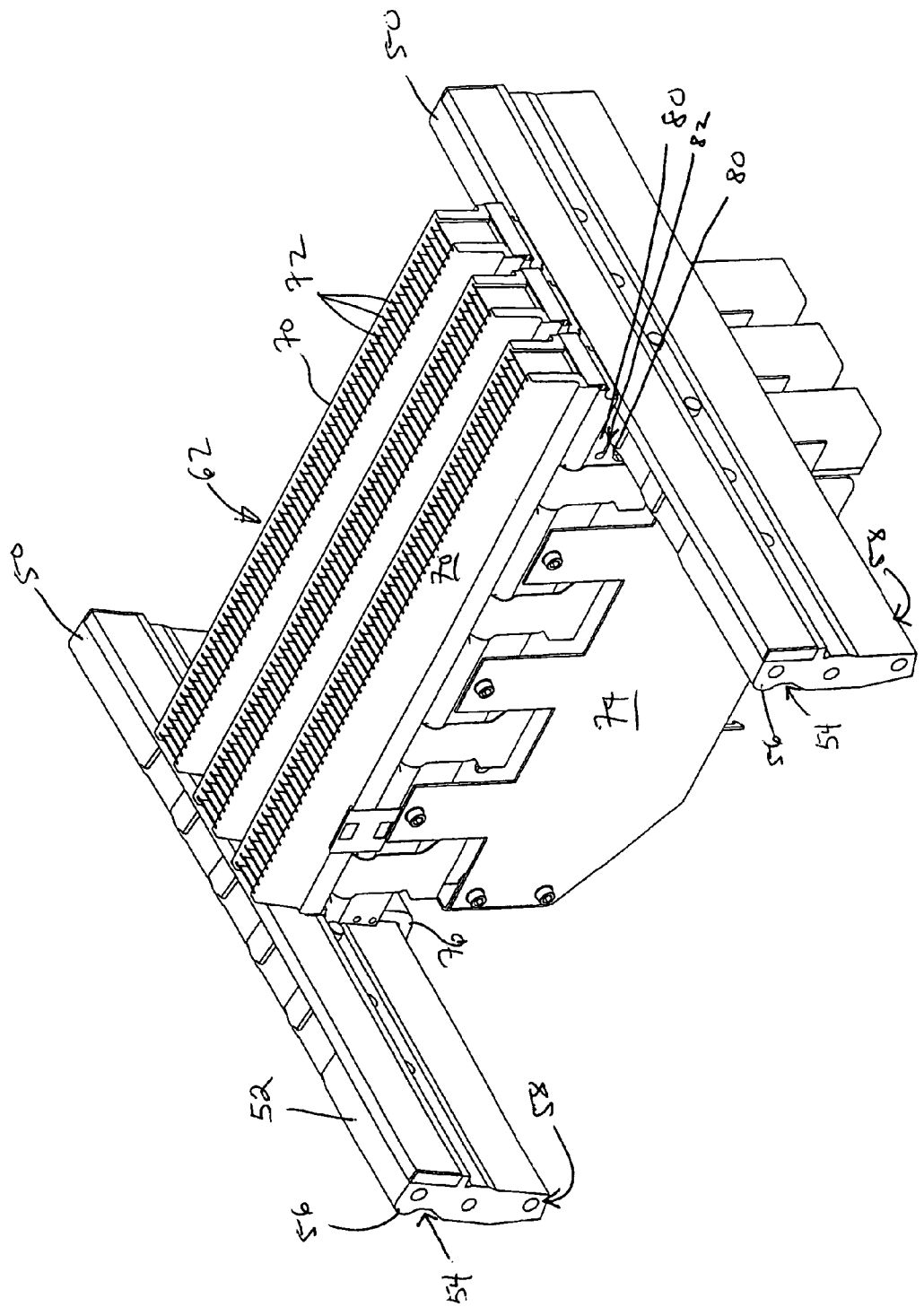
FIG. 9 is a perspective view showing how more than one x-ray detector module may be mounted between a pair of cross-beams, in accordance with one embodiment of the invention.

As can best be seen in FIGS. 8 and 9 of the drawings, each cross-beam 50 includes an elongate body which has an upper surface 52. A longitudinally extending recess 54 runs along a length of the elongate body and along a side thereof. Each cross-beam 50 also includes a rounded nose 56 which runs along the length of the body and is located immediately below the upper surface 52 between the upper surface 52 and the longitudinally extending recess 54. In use, the prongs 80 of a detector module 62 bear against the ridge 56 which exerts a force which tends to pry open the prongs 80. The result is that the end 68 of the x-ray detector module 62 is releaseably locked to the cross-beam 50.

Each cross-beam 50 has a lower surface 58 which induces a plurality of screw-threaded bores (not shown). In use, the mounting brackets 76 of each x-ray detector module 62 are secured to the lower surface of each cross-beam 50 by a bolt (not shown) which extends through one of the bores.

Referring now to FIGS. 4 and 6 of the drawings, it will be seen that the stair-step configuration 64 also includes lead shielding plates 84 which are supported by the cross-beams 50 on either side of an x-ray detector module 62. The purpose of the lead shielding plates 84 is to prevent leakage of x-rays from the gantry structure 16.

The stair-step configuration 64 shown in FIGS. 4 and 5 of the drawings only include a single line of x-ray detector modules 62. However, in other embodiments, a stair-step configuration 64 may be constructed which has more than a single line of x-ray detector modules joined end-to-end. In order to form such a stair-step configuration, it is necessary to mount more than one x-ray detector module 62 between a pair of adjacent cross-beams 50. Such mounting is possible because the cross-beams 50 have a plurality of laterally spaced recessed formations which define seats 86 as can best be seen in FIG. 9 of the drawings. The seats 86 are shaped and dimensioned to receive a mounting formation 78 of an x-ray detector module 62 therein and to be releaseably locked thereto as described above.

An important aspect of the design of the x-ray detector module 62 is that the lead shielding plates 84 do not form part of the x-ray detector module 62. Thus, when a service technician has to remove a module 62 on the stair-step configuration 64 in order to service or replace the module. Such removal is easily achieved because the modules 62 do not include the heavy lead shielding plates 84. Further, each x-ray detector module 62 is held in place within the stair-step configuration 64 by only a single bolt which may easily be removed to allow an x-ray detector module 62 to be removed by the service technician.

Although the present invention has been described with reference to specific exemplary embodiments, it will be evident that various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for mounting a plurality of detector modules to a rotatable gantry structure for an x-ray technique-based non-intrusive inspection apparatus, the method comprising:
    mounting a plurality of laterally spaced transverse support members to the rotatable gantry structure in an x-ray detection zone of the rotatable gantry structure; and
    mounting the plurality of detector modules end-to-end to define a stair-step configuration in the x-ray detection zone, said mounting comprising releaseably securing opposed ends of each detector module to a respective one of a pair of the transverse support members with prongs connected to at least one of the detector module and the transverse support member, a force being applied between the prongs when the detector module is secured to the transverse support member.

2. The method of claim 1, wherein one end is releaseably secured to a transverse support member without the use of a screw-type fastener.

3. The method of claim 2, wherein mounting the plurality of detector modules comprises mounting more than one detector module to each pair of transverse support members.

4. The method of claim 1, wherein the opposed ends are at opposite ends of a long side of each x-ray detector module.

5. A gantry assembly for an x-ray inspection machine, the gantry assembly comprising:
    a gantry structure defining an opening shaped and dimensioned to fit around an x-ray tunnel of the x-ray technique-based non-intrusive inspection apparatus, and an x-ray detection zone adjacent to the opening wherein x-rays passed through the x-ray tunnel are detected;
    a plurality of laterally spaced transversely extending cross-beams connected to the gantry structure within the x-ray detection zone; and
    at least one line of x-ray detector modules mounted end-to-end between adjacent cross-beams to define a stair-step configuration, wherein one end of each x-ray detector module has a mounting formation shaped and dimensioned to releaseably lock with a respective one of the cross-beams, the mounting formation having a first mounting member and a second mounting member, a force being applied between the first and second mounting members when the mounting formation is locked with the respective cross-beam.

6. The gantry assembly of claim 5, wherein the mounting formation is shaped and dimensioned to releaseably lock with the respective one of the cross-beams, without the use of a screw-type fastener.

7. The gantry assembly of claim 6, wherein each cross-beam comprises a plurality of axially spaced seats shaped and dimensioned to releaseably lock with the mounting formation at an end of an x-ray detector module.

8. The gantry assembly of claim 7, further comprising a plurality of said lines of x-ray detector modules, each having the end with the mounting formation locked to a respective one of the seats on a cross-beam.

9. An x-ray technique-based non-intrusive inspection apparatus comprising:
    an x-ray tunnel through which goods to be inspected pass in use;
    a gantry structure rotatably mounted around the x-ray tunnel, wherein the gantry structure includes a plurality of transversely extending cross-beams;
    an x-ray source mounted at one end of the gantry structure; and
    at least one line of x-ray detector modules mounted end-to-end to the gantry support structure to form a stair-step configuration in an x-ray detection zone of the gantry structure, which zone is located opposite the end with the x-ray source, wherein one end of each x-ray detector module has a releasable locking formation to releaseably lock with a cross-beam, the releaseable locking formation having a first mounting member and a second mounting member, a force being applied between the first and second mounting members when the releaseable locking formation is locked with the respective cross-beam.

10. The x-ray technique-based non-intrusive inspection apparatus of claim 9, wherein each x-ray detector module has a collimator piece and electronics associated with detecting x-rays passing through the collimator piece, the electronics being housed in a housing that depends from the collimator piece so that when viewed face-on, the housing is substantially in line with the collimator piece.

11. The x-ray technique-based non-intrusive inspection apparatus of claim 10, wherein the releasable locking formation is shaped and dimensioned to releaseably lock with the cross-beam without the use of a screw-type fastener.

12. The x-ray technique-based non-intrusive inspection apparatus claim 11, further comprising a plurality of said lines of x-ray detector modules.

13. An x-ray technique-based non-intrusive inspection apparatus comprising:
    an x-ray tunnel;
    a conveyor system to convey goods to be inspected through the x-ray tunnel;
    a gantry structure rotatably mounted around the x-ray tunnel, wherein the gantry structure includes a plurality of transversely extending cross-beams;
    an x-ray source mounted at one end of the gantry structure; and
    at least one line of x-ray detector modules mounted end-to-end to the gantry support structure to form a stair-step configuration in an x-ray detection zone of the gantry structure, which zone is located opposite the end with the x-ray source, wherein one end of each x-ray detector module has a releasable locking formation to releaseably lock with a cross-beam, the releaseable locking formation having a first mounting member and a second mounting member, a force being applied between the first and second mounting members when the releaseable locking formation is locked with the respective cross-beam.

14. The apparatus of claim 13, wherein each x-ray detector module has a collimator piece and electronics associated with detecting x-rays passing through the collimator piece, the electronics being housed in a housing that depends from the collimator piece so that when viewed face-on, the housing is substantially in-line with the collimator piece.

15. The apparatus of claim 14, wherein the releasable locking formation is shaped and dimensioned to releaseably lock with the cross-beam without the use of a screw-type fastener.

16. The apparatus of claim 15, further comprising a plurality of said lines of x-ray detector modules.

* * * * *